United States Patent
Choi

(10) Patent No.: US 8,449,732 B2
(45) Date of Patent: May 28, 2013

(54) APPARATUS FOR AUTOMATICALLY PRODUCING WATER CONTAINING NANO GOLD OR SILVER IONS

(76) Inventor: Moon Sik Choi, Incheon (KR)

( * ) Notice: Subject to any disclaimer, the term of this patent is extended or adjusted under 35 U.S.C. 154(b) by 274 days.

(21) Appl. No.: 12/933,880

(22) PCT Filed: Sep. 17, 2008

(86) PCT No.: PCT/KR2008/005490
§ 371 (c)(1),
(2), (4) Date: Oct. 12, 2010

(87) PCT Pub. No.: WO2009/119949
PCT Pub. Date: Oct. 1, 2009

(65) Prior Publication Data
US 2011/0017609 A1    Jan. 27, 2011

(30) Foreign Application Priority Data
Mar. 28, 2008 (KR) .................. 10-2008-0029038

(51) Int. Cl.
*C02F 1/46* (2006.01)
(52) U.S. Cl.
USPC .................. 204/228.6; 204/267; 204/269
(58) Field of Classification Search
USPC ............. 205/701, 742, 743; 204/228.6, 267, 204/269
See application file for complete search history.

(56) References Cited

U.S. PATENT DOCUMENTS

| | | | |
|---|---|---|---|
| 3,095,365 A * | 6/1963 | Green | 204/229.2 |
| 4,946,574 A | 8/1990 | Lin | |
| 6,174,419 B1 | 1/2001 | Akiyama | |
| 7,794,606 B2 * | 9/2010 | Dooley et al. | 210/752 |

FOREIGN PATENT DOCUMENTS

| KR | 20-0342631 | 2/2004 |
|---|---|---|
| KR | 10-2005-0100228 | 10/2005 |
| KR | 10-2007-0053022 | 5/2007 |

OTHER PUBLICATIONS

International Search Report for corresponding PCT/KR2008/005490 mailed Apr. 15, 2009, two pages.

* cited by examiner

*Primary Examiner* — Arun S Phasge
(74) *Attorney, Agent, or Firm* — Sand & Sebolt

(57) ABSTRACT

The present invention provides an apparatus for automatically producing nano-gold or silver ionized water having a simplified structure. Therefore, the apparatus can be easily fabricated with low cost. Since the ionized water is continuously produced using a waterway through which raw water flows, differently from the conventional techniques in which the raw water stays in a reservoir, it is possible to solve problems such as settlement of ionized water, and thus it is possible to produce nano-gold/silver ionized water having a desired concentration of gold/silver ions within a short period of time. As a result, the antibacterial and sterilizing activity which is an intrinsic property of the nano-gold/silver ions is improved, and the thus produced ionized water having strong detergency can be used as antibacterial and sterilizing water.

16 Claims, 11 Drawing Sheets

APPARATUS FOR AUTOMATICALLY PRODUCING WATER CONTAINING NANO GOLD OR SILVER IONS

TECHNICAL FIELD

The present invention relates to an apparatus for producing ionized water and, more particularly, to a method and apparatus for automatically producing nano-gold/silver ionized water in which silver/gold electrode plates are alternately disposed on both sides along a waterway to face each other, and a variable DC voltage is applied to both electrode plates facing each other to produce $Au+3$, $Ag+$, $AgOH$, and $Au(OH)3$ in water passing through the waterway by a water ionization reaction, thus producing nano-gold/silver ionized water at various ion concentrations such that the thus produced nano-gold/silver ionized water can be used as shower water, washing water, agricultural water for green food production, and other sterilizing water.

BACKGROUND ART

With the development of industry, synthetic fiber products, synthetic resin products, and chemical products are widely used.

These artificial products are hard to be decomposed and thus cause environmental pollution.

For example, due to an increase in the use of synthetic detergents during laundry and due to an increase in domestic and industrial wastewater, many peoples are weakened and lose their resistance due to strange and rare diseases.

This environmental pollution is a serious problem that occurs in real life. In fact, internal organs of human body as well as skin are damaged by chemical substances emitted from the clothes that the people wear.

Therefore, it is necessary to make efforts to provide comfortable environment by preventing propagation of pollutants and bacteria such as viruses that cause skin diseases and respiratory ailments.

To meet the above-mentioned necessity, nano-silver ionized water may be used. The nano-silver ionized water, produced by decomposing 99.99% silver into nanoparticles and dissolving the nanoparticles in water, has attracted much attention as an alternative medicine that can cure incurable diseases.

The above-mentioned silver ionized water has the following advantages:

(1) Strong and Excellent Antibacterial Activity

The silver ionized water has excellent antibacterial/sterilizing activity (99.9%) and thus can kill bacteria when they are in contact with silver nanoparticles for more than 5 minutes.

(2) Nontoxic and Harmless to Human Body

Most antibacterial products available in the market are chemical antibacterial agents such as organic metal materials, aniline compounds, quaternary ammonium compounds, phenol compounds, aliphatic esters, and guanidine compounds. Such chemical substances are harmful to the human body and cause bacteria resistance.

Since the silver ionized water is a natural antibacterial/sterilizing agent using microscopic particles of pure silver, it is harmless to the human body.

Therefore, the silver ionized water can be used as an antibacterial/sterilizing agent that can be safely used by infants, children, and old persons whose immunity is very low. In fact, since the amount of silver contained in the silver ionized water is smaller than that contained in Eundan (silver containing refrigerant) that adults use to promote health and remove bad breath, it is harmless to the human body.

(3) Strong Antibacterial/Sterilizing Mechanism

The silver ionized water containing silver nanoparticles having a diameter of 3 to 5 nm directly acts on harmful bacteria to dissolve the cell walls and disturb the electron transport system of harmful bacteria, thus killing the harmful bacteria. Therefore, the silver ionized water has strong and excellent antibacterial/sterilizing activity (99.9%).

According to the main antibacterial mechanism, the silver ionized water dissolves the cell walls of harmful bacteria and reacts with enzyme in the cells to interfere with metabolic function of nutrients, prevent respiratory function of harmful bacteria, prevent generation of APT in the cells, obstruct the growth of harmful bacteria, and destroy the reproductive function of harmful bacteria, thus killing the harmful bacteria.

Moreover, since the antibacterial activity is continuously produced from the nanoparticles of the silver ionized water and controls the harmful bacteria, the persistency of antibacterial/sterilizing activity is excellent. Therefore, the silver ionized water has no resistance to bacteria and has strong and excellent antibacterial/sterilizing activity (99.9%).

(4) Extensive Antibacterial/Sterilizing Spectrum Effect

It is reported that although general antibacterial agents act on specific harmful bacteria, the silver ionized water controls about 650 kinds of harmful bacteria such as *staphylococcus aureus* that causes suppurative diseases and sweaty odors, *proteus vulgaris* that causes erosion in infants and children, *Escherichia coli* that causes foodborne intoxication, *Pseudomonas aeroginosa* that causes inflammation in bronchi, mucous membranes, eyes, and noses, *pneumococcus* that causes pneumonia, *Legionella pneumophila*, and O-157, and viruses and molds.

(5) Persistency and Durability

The silver ionized water has no volatility and elution but has strong adhesion of nanoparticles having a diameter of 3 to 5 nm, and thus the silver ionized water is stable at high temperatures and has persistency and durability, which was proved by a natural fiber test performed in Japan.

Since the nanoparticles of the silver ionized water are pure silver, its antibacterial/sterilizing activity is permanent.

(6) Stability at High Temperatures

Since the silver ionized water contains nanoparticles of pure silver differently from the general chemical antibacterial agents, it is stable even at high temperatures and its antibacterial/sterilizing activity constantly continues.

As such, the silver ionized water provides various advantageous effects. Next, gold ionized water will be described.

Nano-gold ionized water contains gold nanoparticles (1/80,000 of hair thickness). Gold nanoparticles extracted by plasma equipment have a high purity of 99.000%. If the purity is less than 98%, the particles may cause damage to the human body when used for other than industrial purposes.

It is reported that the gold ionized water has the following effects:

(1) Mind relaxation effect;

(2) Detoxification function;

(3) Treatment of epilepsy, palpitation, and infant convulsion;

(4) Treatment of tumors;

(5) Efficacious in arthritis and neuralgia;

(6) Removal of noxious substances from the body; and (7) Efficacious in skin diseases due to skin purification function.

The gold nanoparticles having the above-described effects can infiltrate the skin s dermis layer, and thus its effect can be maximized to several dozen to several hundred times.

Moreover, it is reported that although gold nanoparticles having a diameter of 10.6 nm cannot remove carbon monoxide, gold nanoparticles having a diameter of 2.4 nm can oxidize and remove carbon monoxide.

Furthermore, it is reported that the gold nanoparticles supported by oxidized iron can decompose and oxidize ozone and carbon monoxide at room temperature, and thus the gold nanoparticles can be used as an environmental catalyst for purifying indoor air.

However, there is no apparatus or method for producing nano-gold/silver ionized water having the above-described effects.

Moreover, although there are several techniques for using the silver ionized water, they cannot control the temperature, amount, and concentration of silver ionized water in accordance with the purity to provide stabilized ionized water. Further, the conventional techniques do not use gold ionized water, and there is no technique for stably producing nano-gold/silver ionized water by controlling the temperature, amount, and concentration of ionized water in accordance with the purity while keeping the flow velocity.

DISCLOSURE OF INVENTION

Technical Problem

The present invention has been made in an effort to solve the above-described problems associated with prior art.

A first object of the present invention is to provide a method and apparatus for simultaneously producing nano-gold/silver ionized water while keeping the flow velocity.

A second object of the present invention is to provide a method and apparatus for automatically producing nano-gold/silver ionized water while keeping the flow velocity and supplying the thus produced ionized water to a swimming pool or other facility that requires a large amount of water.

A third object of the present invention is to provide a method and apparatus for automatically producing nano-gold/silver ionized water, which has a simplified structure to facilitate the maintenance and repair and reduce the manufacturing cost.

A fourth object of the present invention is to provide a method and apparatus for stably supplying nano-gold/silver ionized water by controlling the temperature, amount, and concentration of ionized water in accordance with the purity while keeping the flow velocity.

Technical Solution

To accomplish the object of the present invention, there is provided a method for automatically producing nano-gold/silver ionized water, the method including: a raw water supply step in which raw water is filtered by a filter F, passed through a flow control valve V for controlling the amount of raw water, and supplied after the amount of raw water is measured by a flow meter M in real time; a nano-gold/silver ionized water production step in which after the amount of the raw water is measured by the flow meter M, the raw water is passed through a nano-gold/silver ionized water producer P to produce nano-gold/silver ionized water; a control step in which a controller C connected to the nano-gold/silver ionized water producer P controls a microprocessor and a driver, which control the filter F and the flow meter M, a current/voltage driver, and the opening/closing of a valve; and a sensing step in which a sensor I connected to the controller C measures the amount and concentration of ionized water passing through the nano-gold/silver ionized water producer P to optimally supply the nano-gold/silver ionized water.

Advantageous Effects

According to the present invention having the above-described configuration, since the apparatus for automatically producing nano-gold/silver ionized water in accordance with the present invention has a simplified structure, it can be easily fabricated with low cost. Moreover, since the ionized water is continuously produced using a waterway through which raw water flows, differently from the conventional techniques in which the raw water stays in a reservoir, it is possible to solve problems such as settlement of ionized water, and thus it is possible to produce nano-gold/silver ionized water having a desired concentration of gold/silver ions within a short period of time. As a result, the antibacterial and sterilizing activity which is an intrinsic property of the nano-gold/silver ions is improved, and the thus produced ionized water having strong detergency can be used as antibacterial and sterilizing water.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

DESCRIPTION OF REFERENCE NUMERALS FOR MAJOR ELEMENTS IN THE DRAWINGS

Figure 1:
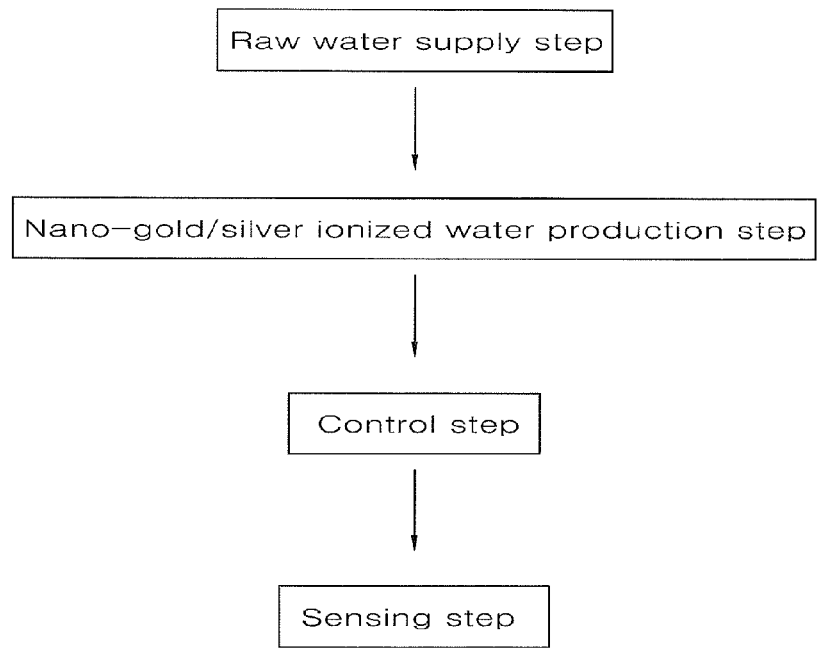
FIG. 1 is a schematic flowchart of a method for automatically producing nano-gold/silver ionized water in accordance with an embodiment of the present invention.

10: cell 20: connecting passage
30: inlet 40: outlet
50: upper body 60: lower body
70: silver/gold electrode plate
80: insulator 100: fixing groove
340: waterway
700: alternate variable DC power supply
C: controller F: filter
H: main body I: sensor
M: flow meter P: ionized water producer
V: flow control valve

BEST MODE FOR CARRYING OUT THE INVENTION

The present invention provides a method for automatically producing nano-gold/silver ionized water, the method including: a raw water supply step in which raw water is filtered by a filter, passed through a flow control valve for controlling the amount of raw water, and supplied after the amount of raw water is measured by a flow meter in real time; a nano-gold/silver ionized water production step in which after the amount of the raw water is measured by the flow meter, the raw water is passed through a nano-gold/silver ionized water producer to produce nano-gold/silver ionized water; a control step in which a controller connected to the nano-gold/silver ionized water producer controls a microprocessor and a driver, which control the filter and the flow meter, a current/voltage driver, and the opening/closing of a valve; and a sensing step in which a sensor connected to the controller measures the amount and concentration of ionized water passing through the nano-gold/silver ionized water producer to optimally supply the nano-gold/silver ionized water.

The current/voltage driver may be a variable direct current voltage driver that alternates the output based on the ion concentration.

Moreover, the present invention provides an apparatus for automatically producing nano-gold/silver ionized water, the apparatus including: a plurality of cells in which a pair of fixing grooves is formed on both sides thereof; a plurality of connecting passages formed between adjacent cells such that the adjacent cells are connected to each other through the connecting passages; a main body including a waterway having a water inlet connected to the two connected cells at both ends and a nano-gold/silver ionized water outlet having a concentration sensor on the top thereof, an upper body, and a lower body, the upper and lower bodies being closely adhered to each other; and a plurality of silver/gold electrode plates mounted in the fixing grooves.

Furthermore, the present invention provides an apparatus for automatically producing nano-gold/silver ionized water, the apparatus including: a plurality of cells in which a pair of fixing grooves is formed on both sides thereof; a plurality of insulators for insulating the plurality of cells from each other; a main body including a waterway having a water inlet connected to the two connected cells at both ends and a nano-gold/silver ionized water outlet having a concentration sensor on the top thereof, an upper body, and a lower body, the upper and lower bodies being closely adhered to each other; and a plurality of silver/gold electrode plates mounted in the fixing grooves.

The connecting passages may be formed in the same direction as the waterway direction and, at the same time, formed inclined with respect to the waterway direction or formed in parallel to the waterway direction.

The connecting passages may have a cross-section equal to or smaller than that of the cell.

The waterway comprising the plurality of cells may be formed in a zigzag shape.

Each of the silver/gold electrode plates may have a ⊏-shape.

The silver/gold electrode plates may be alternately arranged in the fixing grooves.

The pair of fixing grooves may be independently formed in each cell, and the silver/gold electrode plates may be disposed in the pair of fixing grooves and connected to each other in parallel.

The fixing grooves on one side of the adjacent cells may be alternately connected to each other, and the silver/gold electrode plate may be provided in the two connected fixing grooves and connected to each other in series.

The waterway may have a straight shape.
The waterway may have a U-shape.

MODE FOR THE INVENTION

Hereinafter, exemplary embodiments of the present invention will be described in more detail with reference to the accompanying drawings.

Figure 2:
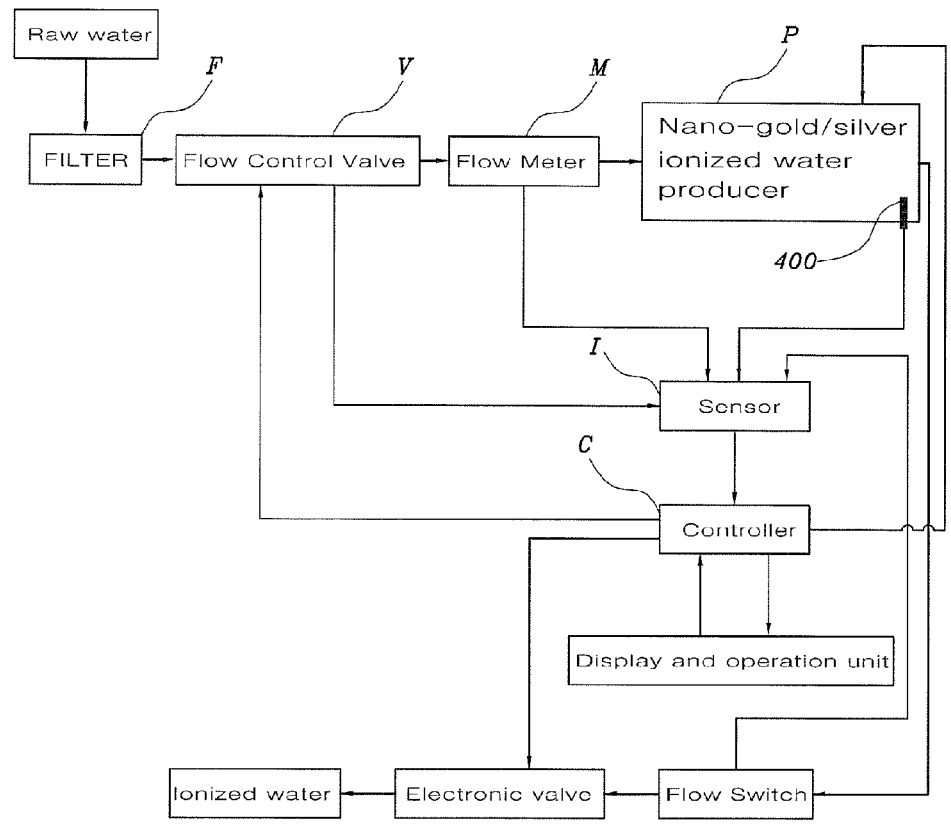
FIG. 2 is a schematic diagram of the method for automatically producing nano-gold/silver ionized water of the present invention.
Figure 3:
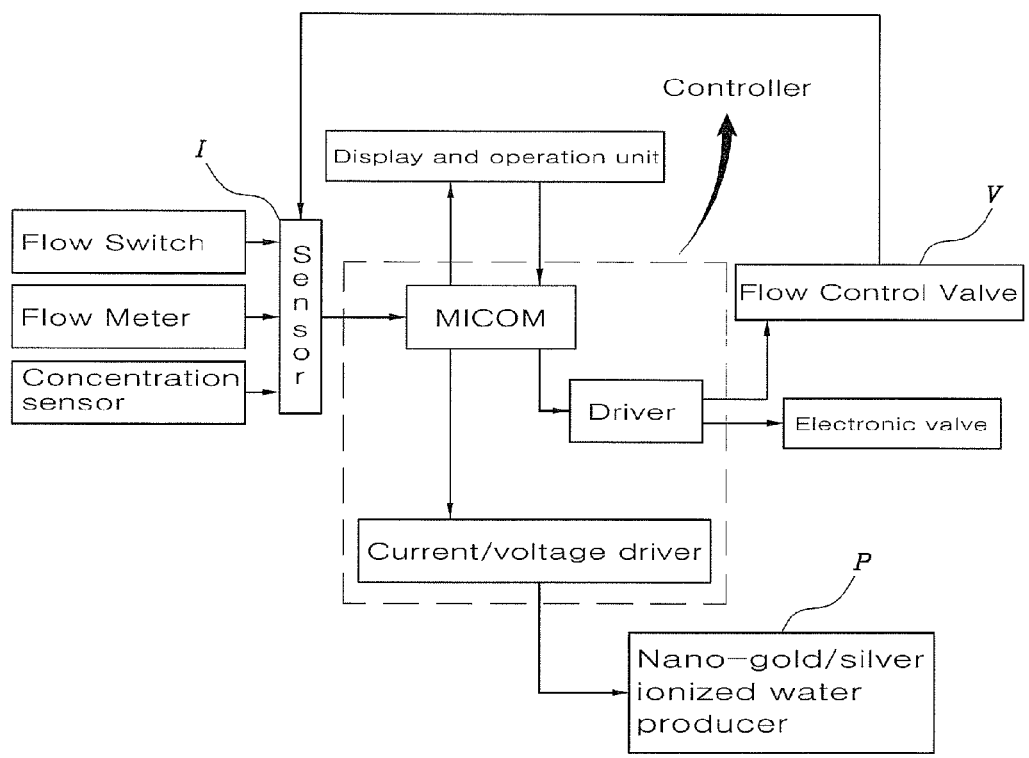
FIG. 3 is a schematic diagram of a controller in the method for automatically producing nano-gold/silver ionized water of the present invention.
Figure 4:
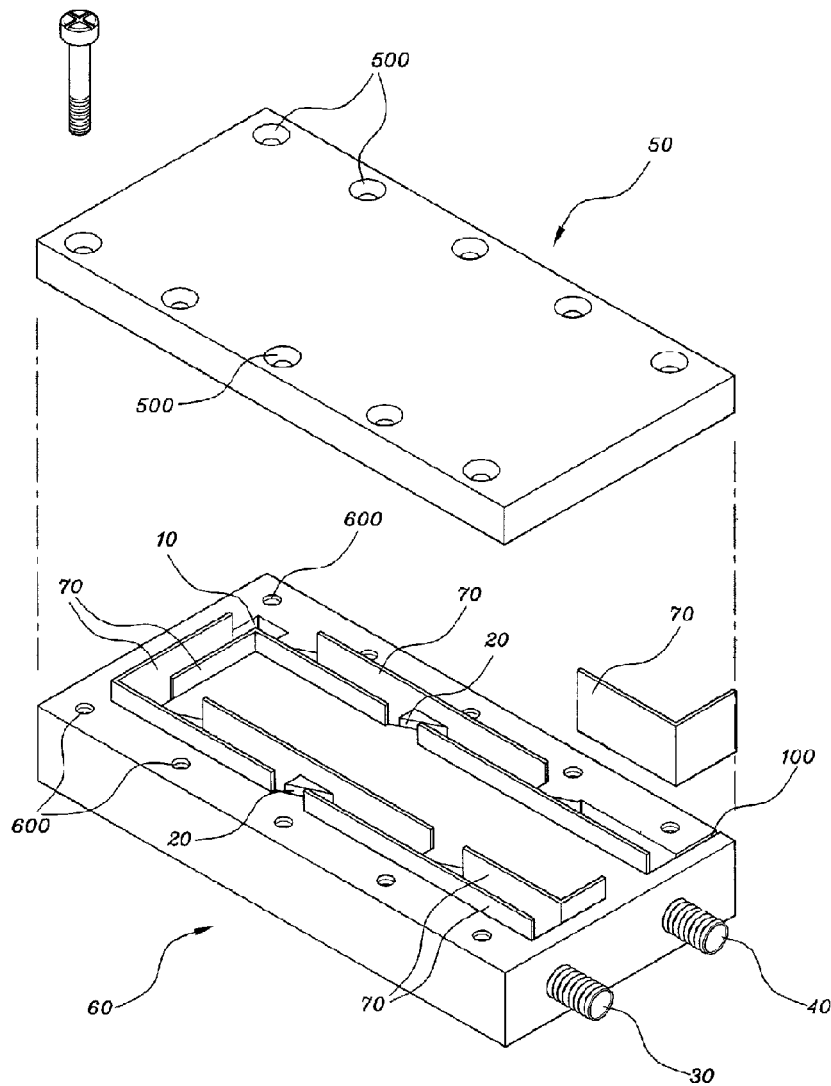
FIG. 4 is an exploded perspective view of an apparatus for automatically producing nano-gold/silver ionized water in accordance with another embodiment of the present invention.
Figure 5:
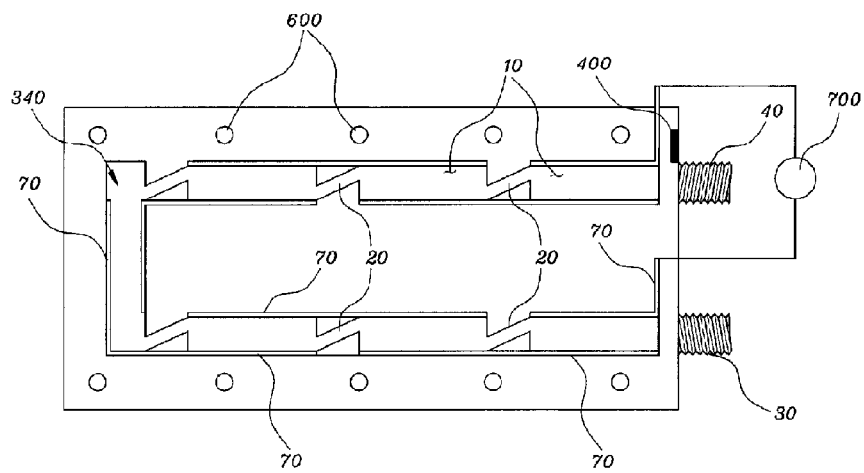
FIG. 5 is a plan view of the apparatus for automatically producing nano-gold/silver ionized water of the present invention in which a power supply is connected in series.
Figure 6:
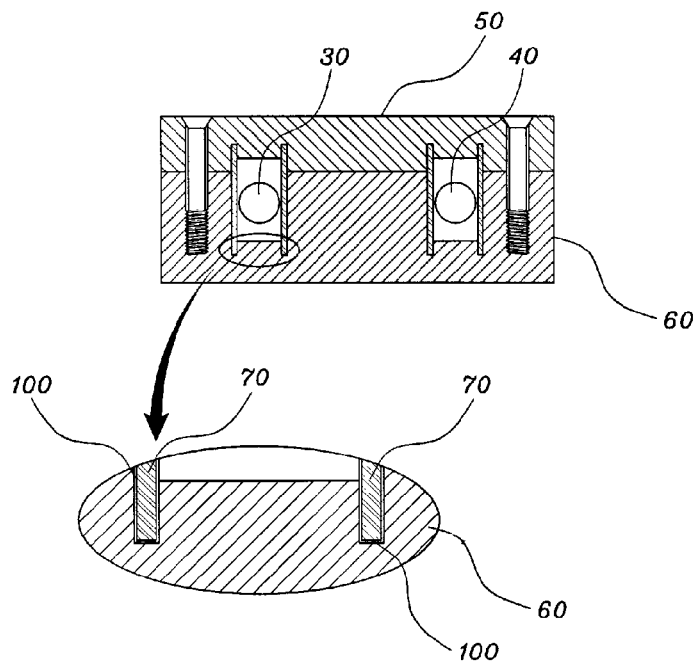
FIG. 6 is a cross-sectional view of the apparatus for automatically producing nano-gold/silver ionized water of the present invention.
Figure 7:
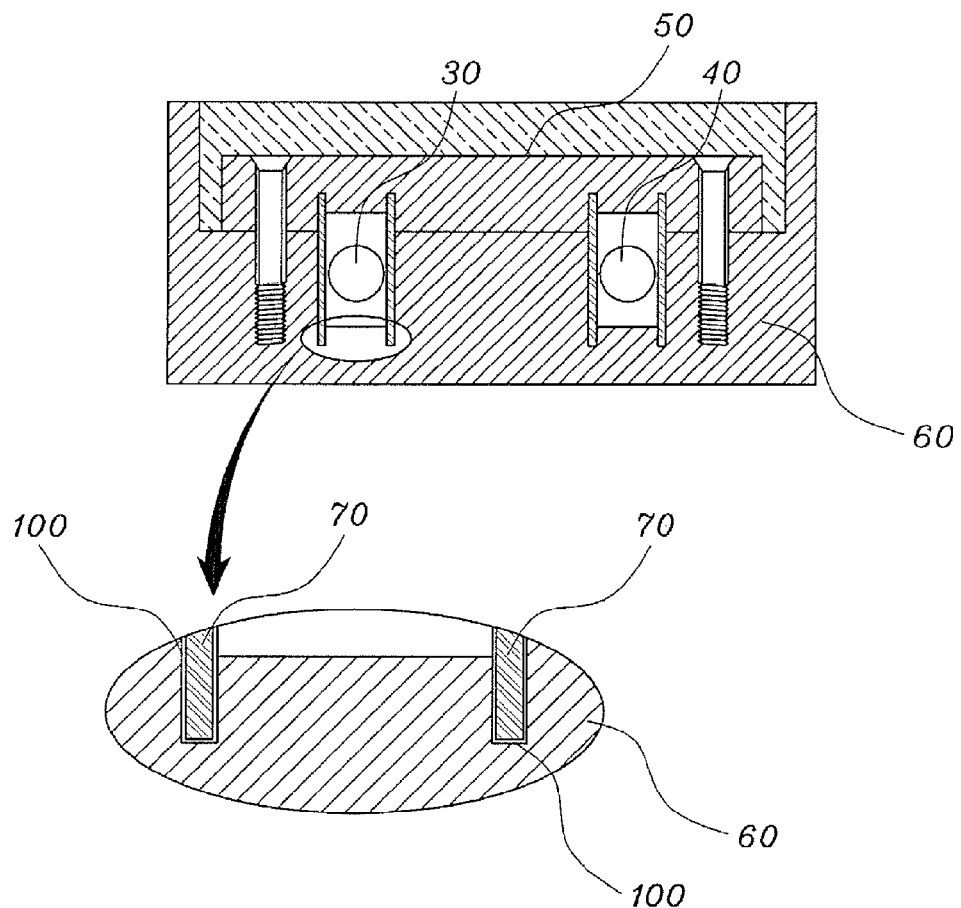
FIG. 7 is a cross-sectional view of the apparatus for automatically producing nano-gold/silver ionized water of the present invention in which the exterior of an upper body is molded with epoxy resin.
Figure 8:
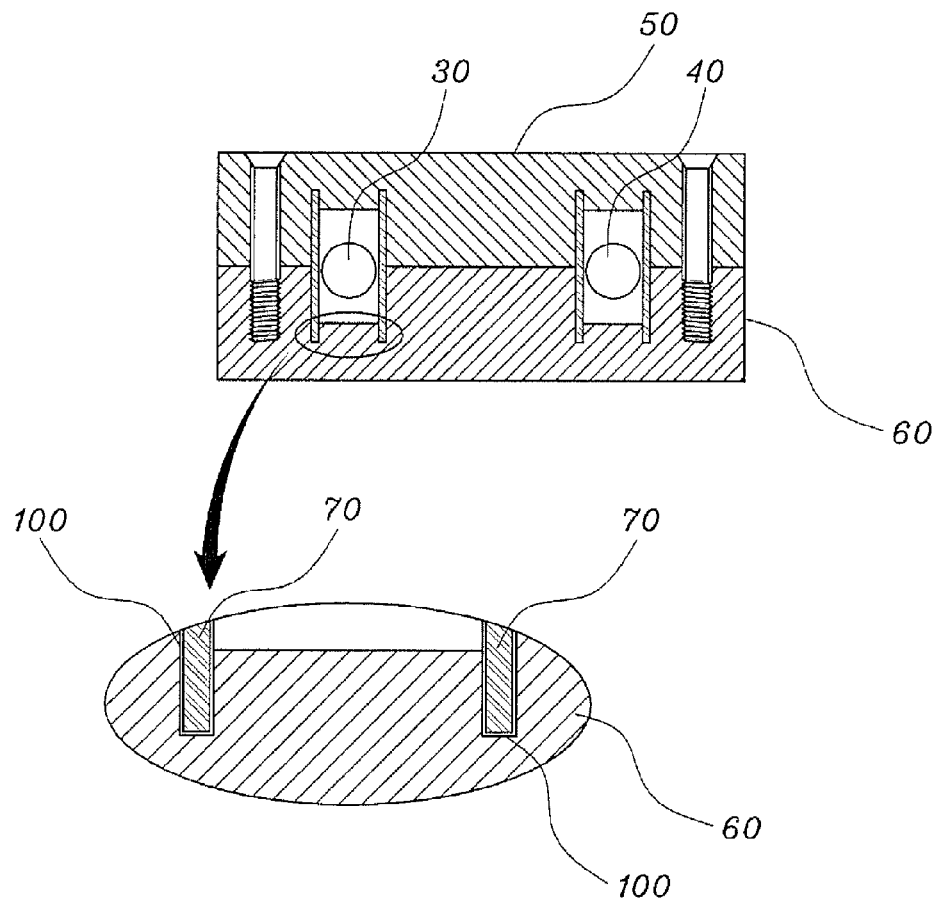
FIG. 8 is a cross-sectional view of a modified example of the apparatus for automatically producing nano-gold/silver ionized water of the present invention.
Figure 9:
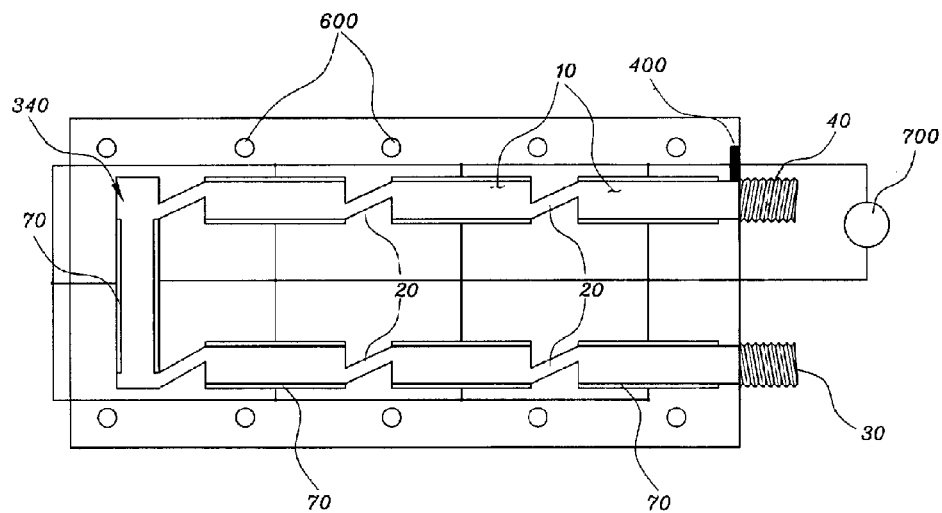
FIG. 9 is a plan view of the apparatus for automatically producing nano-gold/silver ionized water of the present invention in which the power supply is connected in parallel.
Figure 10:
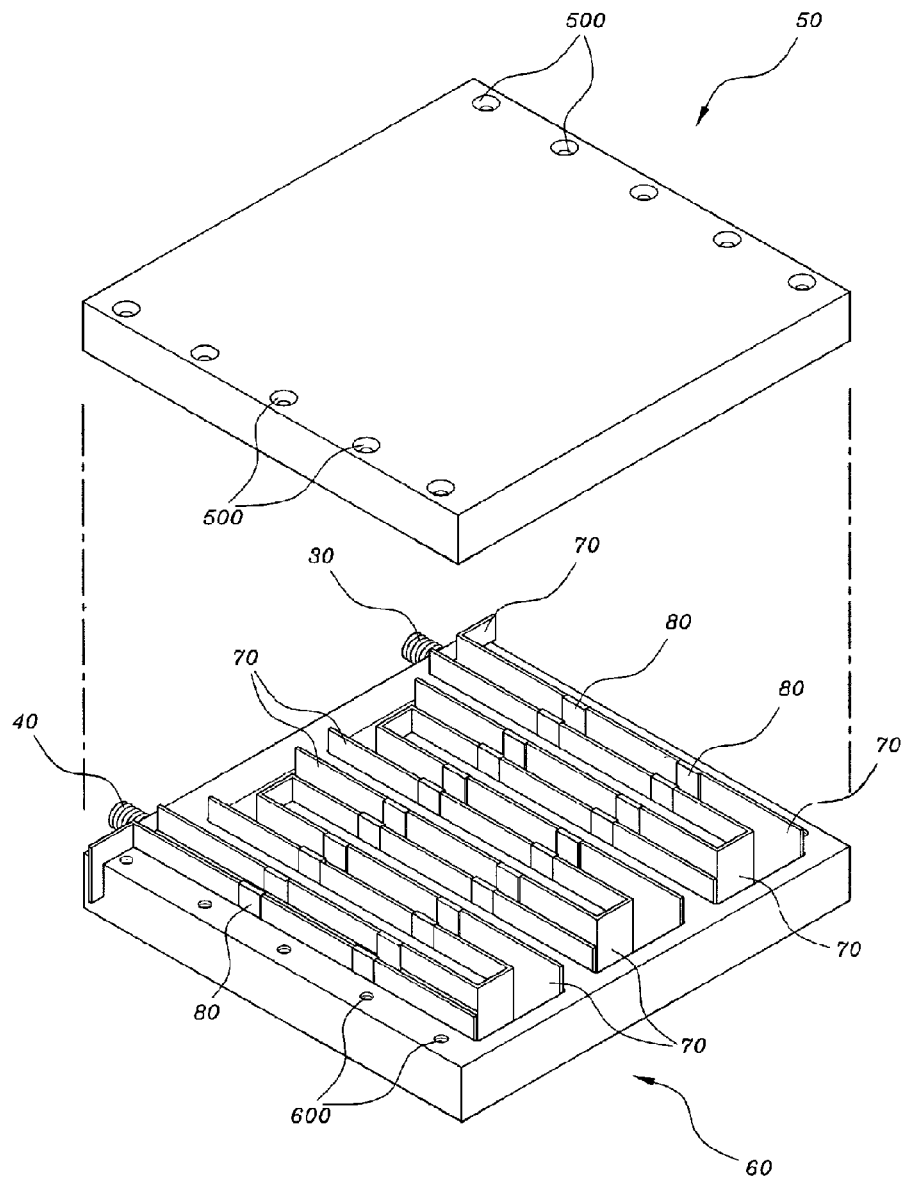
FIG. 10 is an exploded perspective view of an apparatus for automatically producing nano-gold/silver ionized water in accordance with still another embodiment of the present invention in which a power supply is connected in parallel.
Figure 11:
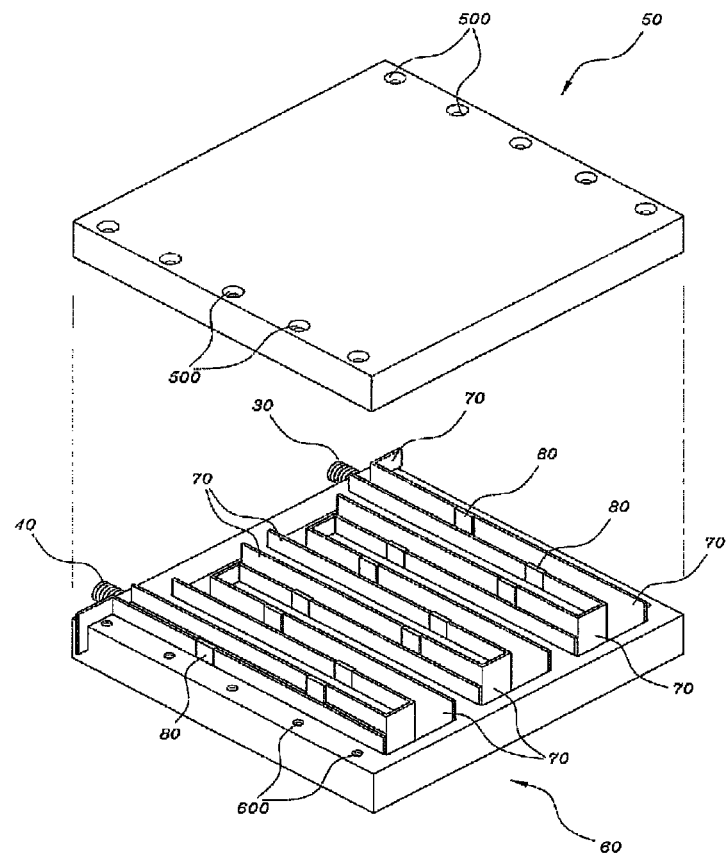
FIG. 11 is an exploded perspective view of the apparatus for automatically producing nano-gold/silver ionized water in accordance with still another embodiment of the present invention in which the power supply is connected in series.
Figure 12:
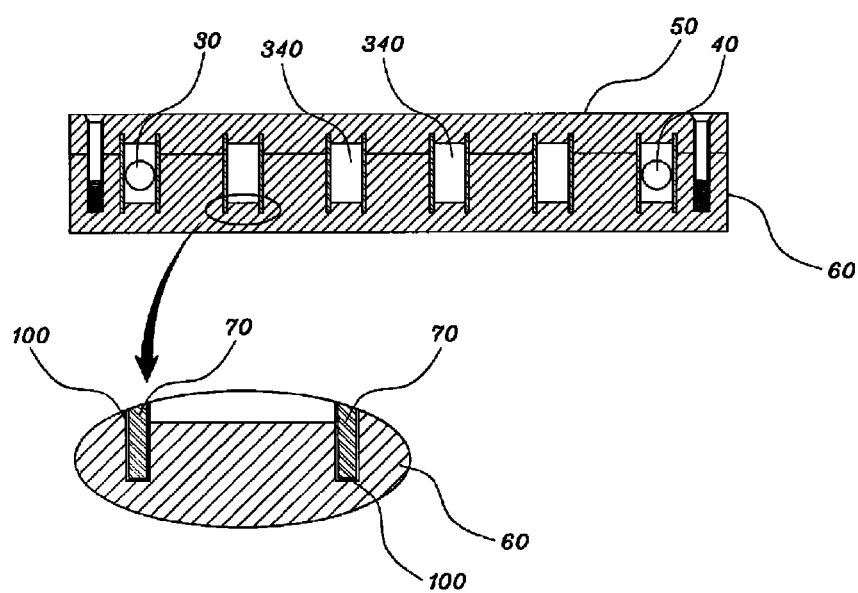
FIG. 12 is a schematic cross-sectional view of the apparatus for automatically producing nano-gold/silver ionized water in accordance with still another embodiment of the present invention.
Figure 13:
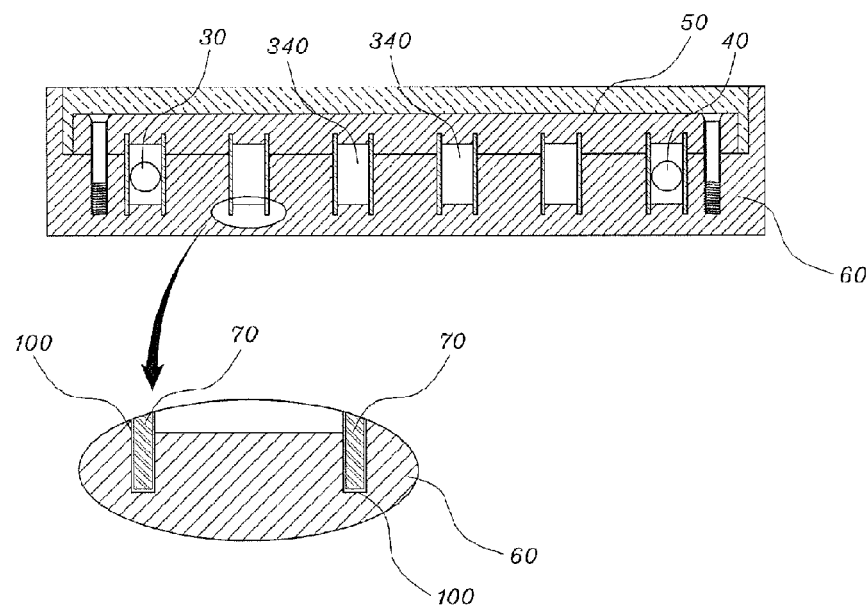
FIG. 13 is a schematic cross-sectional view of the apparatus for automatically producing nano-gold/silver ionized water in accordance with still another embodiment of the present invention in which the exterior of an upper body is molded with epoxy resin.
Figure 14:
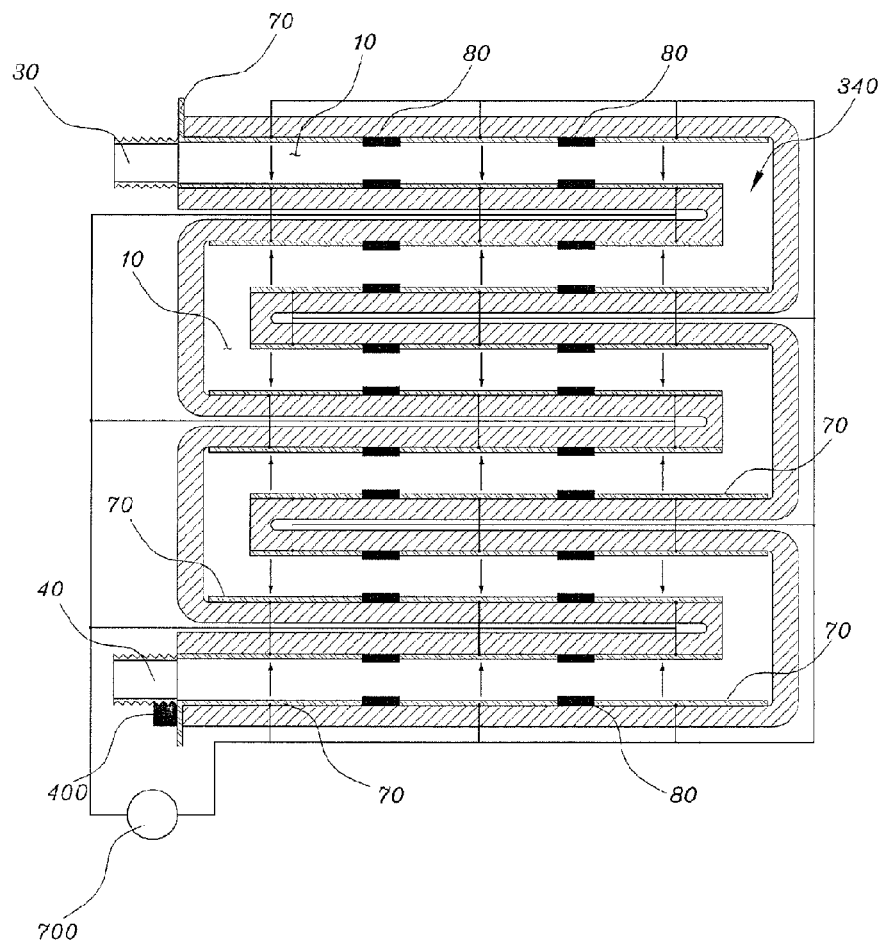
FIG. 14 is a plan view of the apparatus for automatically producing nano-gold/silver ionized water of FIG. 10 in which the power supply is connected in parallel.
Figure 15:
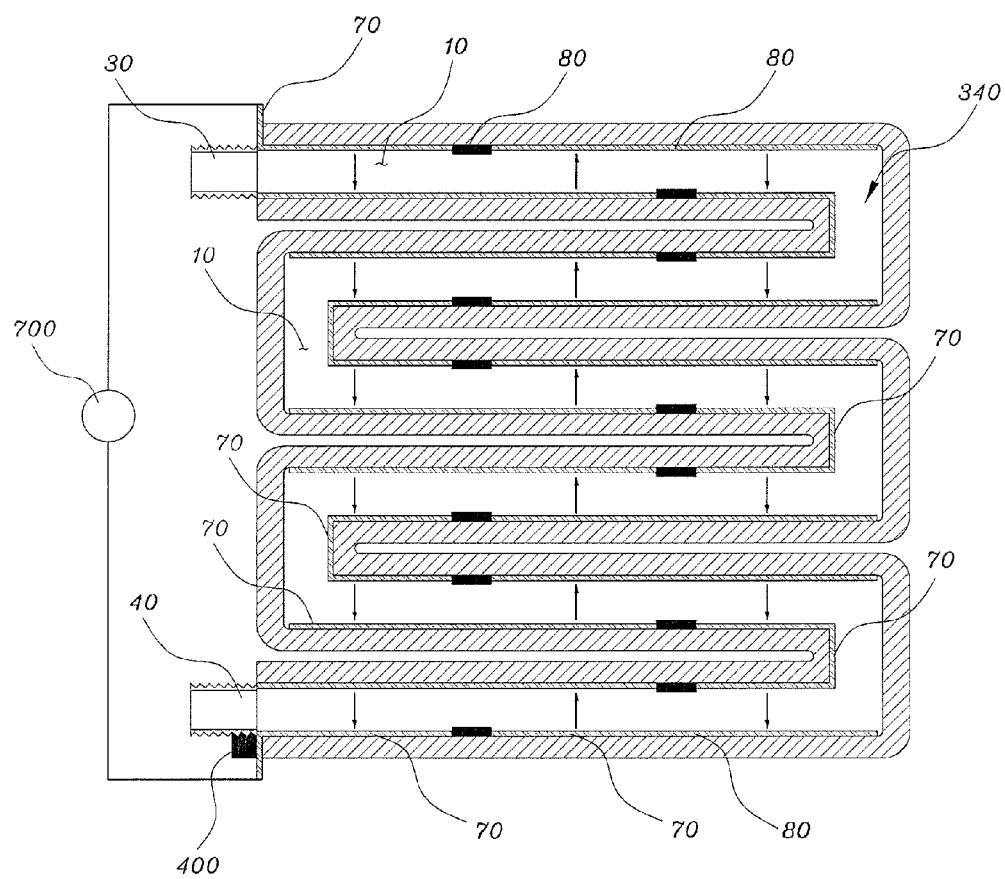
FIG. 15 is a plan view of the apparatus for automatically producing nano-gold/silver ionized water of FIG. 11 in which the power supply is connected in series.
Figure 16:
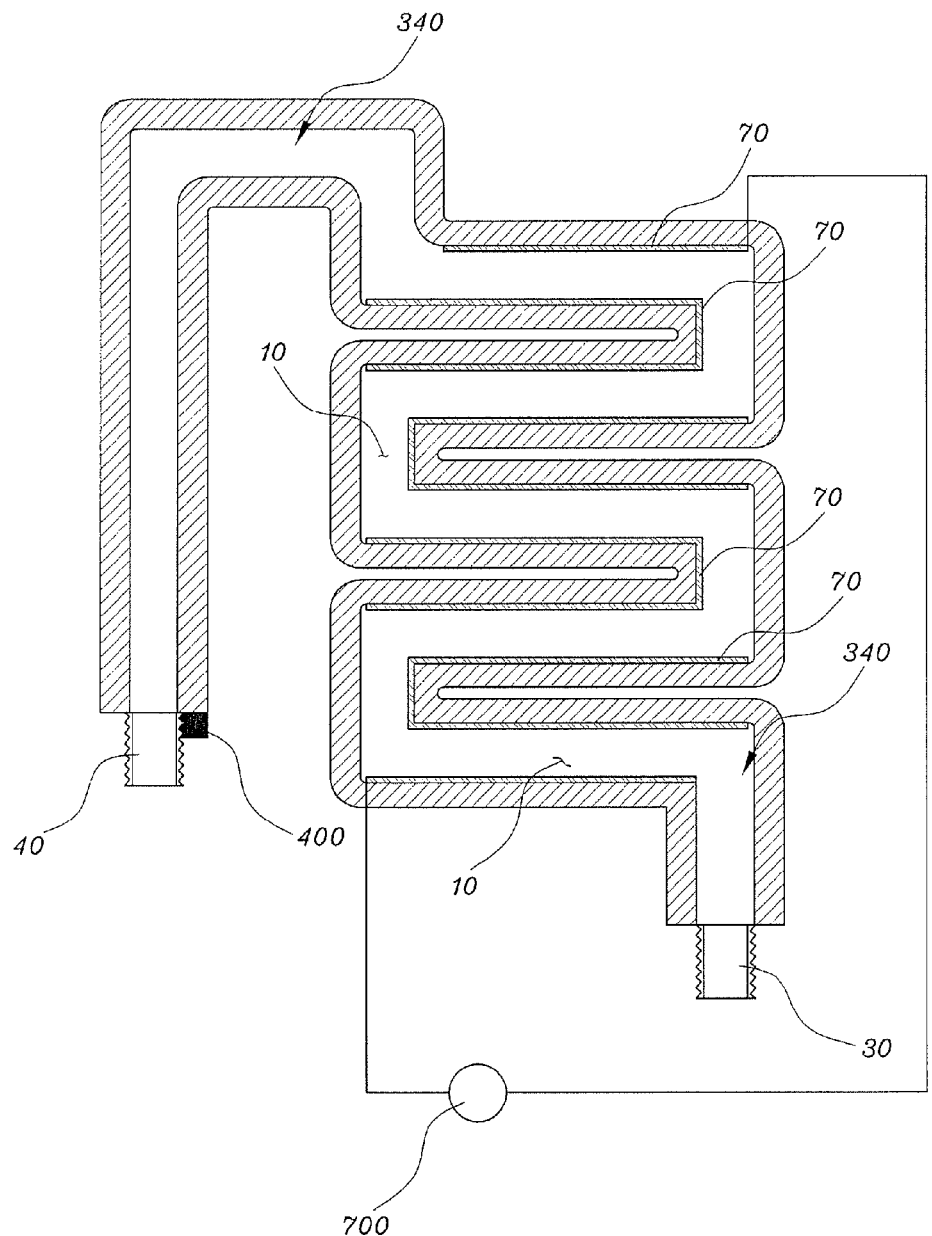
FIG. 16 is a plan view of an apparatus for automatically producing nano-gold/silver ionized water in accordance with yet another embodiment of the present invention in which a power supply is connected in series.
Figure 17:
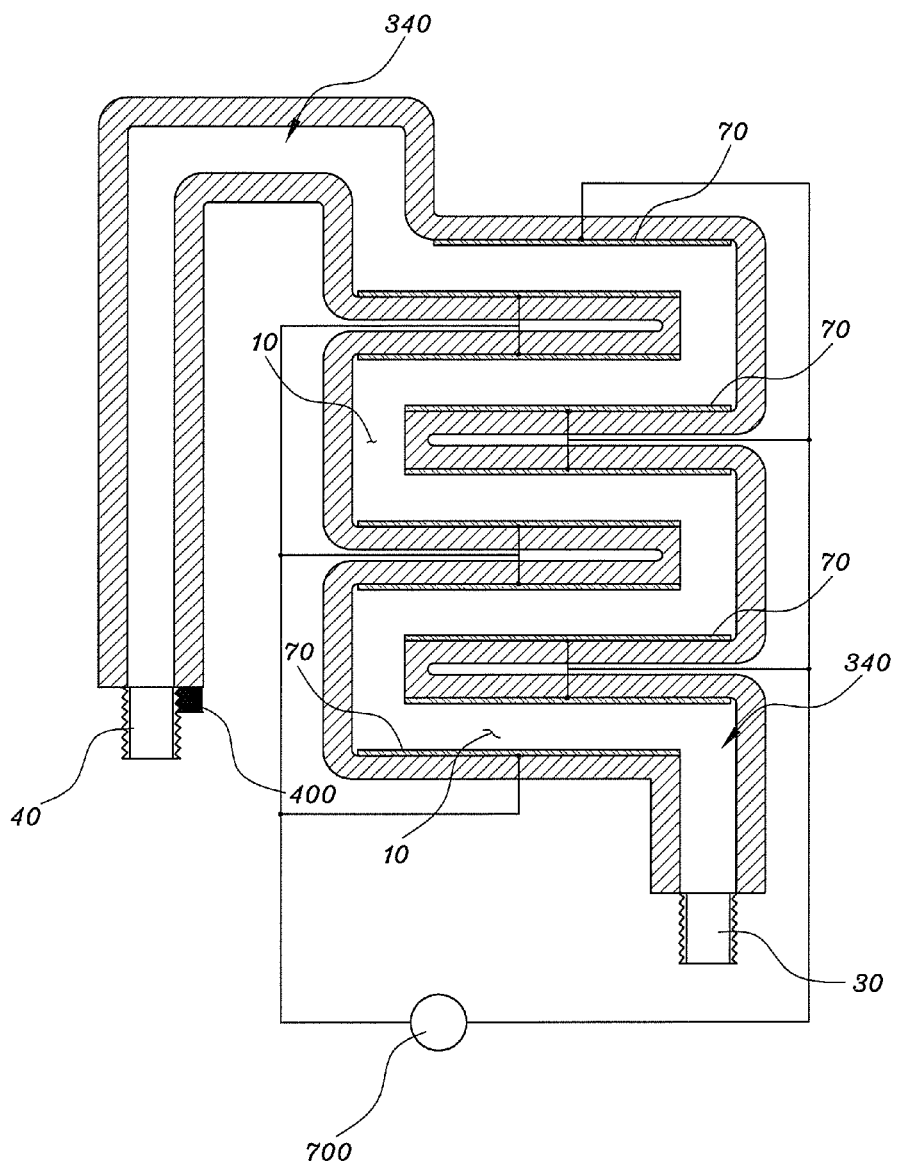
FIG. 17 is a plan view of the apparatus for automatically producing nano-gold/silver ionized water in accordance with yet another embodiment of the present invention in which the power supply is connected in parallel.

FIG. 1 is a schematic flowchart of a method for automatically producing nano-gold/silver ionized water in accordance with an embodiment of the present invention, FIG. 2 is a schematic diagram of the method for automatically producing nano-gold/silver ionized water of the present invention, FIG. 3 is a schematic diagram of a controller in the method for automatically producing nano-gold/silver ionized water of the present invention, FIG. 4 is an exploded perspective view of an apparatus for automatically producing nano-gold/silver ionized water in accordance with another embodiment of the present invention, FIG. 5 is a plan view of the apparatus for automatically producing nano-gold/silver ionized water of the present invention in which a power supply is connected in series, FIG. 6 is a cross-sectional view of the apparatus for automatically producing nano-gold/silver ionized water of the present invention, FIG. 7 is a cross-sectional view of the apparatus for automatically producing nano-gold/silver ionized water of the present invention in which the exterior of an upper body is molded with epoxy resin, FIG. 8 is a cross-sectional view of a modified example of the apparatus for automatically producing nano-gold/silver ionized water of the present invention, FIG. 9 is a plan view of the apparatus for automatically producing nano-gold/silver ionized water of the present invention in which the power supply is connected in parallel, FIG. 10 is an exploded perspective view of an apparatus for automatically producing nano-gold/silver ionized water in accordance with still another embodiment of the present invention in which a power supply is connected in parallel, FIG. 11 is an exploded perspective view of the apparatus for automatically producing nano-gold/silver ionized water in accordance with still another embodiment of the present invention in which the power supply is connected in series, FIG. 12 is a schematic cross-sectional view of the apparatus for automatically producing nano-gold/silver ionized water in accordance with still another embodiment of the present invention, FIG. 13 is a schematic cross-sectional view of the apparatus for automatically producing nano-gold/silver ionized water in accordance with still another embodiment of the present invention in which the exterior of an upper body is molded with epoxy resin, FIG. 14 is a plan view of the apparatus for automatically producing nano-gold/silver ionized water of FIG. 10 in which the power supply is connected in parallel, FIG. 15 is a plan view of the apparatus for automatically producing nano-gold/silver ionized water of FIG. 11 in which the power supply is connected in series, FIG. 16 is a plan view of an apparatus for automatically producing nano-gold/silver ionized water in accordance with yet another embodiment of the present invention in which a power supply is connected in series, and FIG. 17 is a plan view of the apparatus for automatically producing nano-gold/silver ionized water in accordance with yet another embodiment of the present invention in which the power supply is connected in parallel.

First, a method for automatically producing nano-gold/silver ionized water of the present invention will be described with reference to the accompanying drawings below.

The method for automatically producing nano-gold/silver ionized water of the present invention includes: a raw water supply step in which raw water is filtered by a filter F, passed through a flow control valve V for controlling the amount of raw water, and supplied after the amount of raw water is measured by a flow meter M in real time; a nano-gold/silver ionized water production step in which after the amount of the raw water is measured by the flow meter M, the raw water is passed through a nano-gold/silver ionized water producer P to produce nano-gold/silver ionized water; a control step in which a controller C connected to the nano-gold/silver ionized water producer P controls a microprocessor and a driver, which control the filter F and the flow meter M, a current/voltage driver, and the opening/closing of a valve; and a sensing step in which a sensor I connected to the controller C measures the amount and concentration of ionized water passing through the nano-gold/silver ionized water producer P to optimally supply the nano-gold/silver ionized water.

Preferably, the current/voltage driver is a variable DC voltage driver that alternates the output every predetermined period of time based on the ion concentration.

That is, according to the method for automatically producing nano-gold/silver ionized water of the present invention, after the raw water is passed through the filter F, an optimal amount of raw water is supplied by the flow meter M for measuring the amount of raw water and supplying the raw water, and the raw water is passed through the nano-gold/silver ionized water producer P while keeping the flow velocity, thus producing the ionized water.

For this purpose, the controller C controls the microprocessor and the driver, which control the filter F, the flow control valve V, the current/voltage driver, and the opening/closing of the valve, and the sensor I detects the amount and concentration of ionized water, thus producing optimal nano-gold/silver ionized water, which are shown in FIGS. 1 to 3.

Next, the apparatus for automatically producing nano-gold/silver ionized water of the present invention will be described.

Example 1

As shown in FIGS. 4 to 8, the apparatus for automatically producing nano-gold/silver ionized water includes: a plurality of cells 10 in which a pair of fixing grooves 100 is formed on both sides thereof, each of the fixing grooves 100 including a plurality of silver and electrode plates 70, which alternately receive positive and negative power and face each other, two cells 10 being disposed on both sides of a plastic rectangular parallelepiped and one cell 10 being disposed between the two cells 10 to form a U-shape; a plurality of connecting passages 20 formed between adjacent cells 10 such that the adjacent cells 10 are connected to each other through the connecting passages 20 and having a cross-section smaller than the groove of each cell 10 and an opening on the top; a lower body 60 including a U-shaped waterway 340 formed by a water inlet 30 and a nano-gold/silver ionized water outlet 40 connected to the two cells 10 disposed on both sides and having a bent or straight shape such that the fixing grooves 100 of the adjacent cells 10 are alternately connected to each other; an upper body 50 including the plurality of fixing grooves 100 corresponding to the cells 10 of the lower body 60 and the openings of the connecting passages 20; and the plurality of bent or straight silver/gold electrode plates 70 mounted in the plurality of fixing grooves 100.

Moreover, the silver/gold electrode plates 70 are fixed vertically by the fixing grooves 100 formed vertically on both wall surfaces of the cells 10 formed by the upper and lower bodies 50 and 60.

Further, a concentration sensor 400 is disposed on the top of the nano-gold/silver ionized water outlet 40 to detect the ion concentration under the control of the microprocessor, thus optimally controlling the ion concentration.

Preferably, the connecting passages 20 are formed in the same direction as the waterway direction and, at the same time, formed inclined with respect to the waterway direction or formed in parallel to the waterway direction.

More preferably, each of the connecting passages 20 has a cross-section smaller than that of the cell 10.

The silver/gold electrode plates 70 are alternately formed in the fixing grooves 100.

The fixing grooves 100 on one side of adjacent cells 10 are alternately connected to each other, and the silver/gold electrode plate 70 is disposed in the two connected fixing grooves 100 and connected to each other in series.

The waterway 340 is formed in a straight shape or in a U-shape.

In detail, a plurality of fastening holes 500 into which bolts are inserted are formed on both sides of the upper body 50 and a plurality of screw holes 600 are formed on both sides of the lower body 60 such that the upper and lower bodies 50 and 60 are fastened by the bolts in which the waterway 340 including the water inlet 30, seven cells 10, six connecting passages 20, and the nano-gold/silver ionized water outlet 40 is formed.

Meanwhile, the silver/gold electrode plates 70 adjacent to the water inlet 30 and the nano-gold/silver ionized water outlet 40 among the U-shaped silver/gold electrode plates 70 are connected to an alternate variable DC power supply 700 such that the silver/gold electrode plates 70 are electrically connected to each other in series.

FIG. 7 shows that the exterior of the upper body 50 is molded with epoxy resin to provide a waterproofing function.

As described above, the silver/gold electrode plates 70 are alternately positioned to face each other such that the cells 10 are electrically connected to each other by the silver/gold electrode plates 70.

According to Example 1 of the present invention, when water is supplied from a reservoir located at a higher elevation or by a pump, a positive or negative voltage is alternately supplied to the bent silver/gold electrode plates 70 in the two cells 10 on left and right sides by the alternate variable DC power supply 700. Then, a current flows between the two straight silver/gold electrode plates 70 having opposite polarities and facing each other through water as an electrolyte such that gold/silver ions are produced from the silver/gold electrode plates 70 by the current. The thus produced nano-gold/silver ions are dissolved in water and react with water to form silver hydroxide AgOH and $Au(OH)_3$. The silver hydroxide changes the water into alkaline water (pH 7.1 to 8.0), thus producing nano-gold/silver ionized water having strong detergency. The thus produced nano-gold/silver ionized water passes through the inclined connecting passage 20 having a diameter smaller than the cell 10 to migrate to the next cell 10. At this time, since the diameter of the connecting passage 20 is small, the nano-gold/silver ionized water swirls at the start and end points of the connecting passage 20 to be uniformly mixed. Then, the current is transferred to the next cell 10 by the straight silver/gold electrode plates 70 on one side of the cell 10 and operates in the same manner as the first cell 10 to produce nano-gold/silver ionized water having a higher concentration. When the current continuously passes through the cells 10 of the waterway 340 and operates in the same manner, the nano-gold/silver ionized water having an increased concentration is discharged through the nano-gold/silver ionized water outlet 40.

Since the nano-gold/silver ionized water is continuously produced in the respective cells 10, the concentration of gold/silver ions increases while passing through the respective cells 10. Since the amount of gold/silver ions produced is proportional to the amount of electric charge and the amount of electric charge is proportional to "current X time" a constant current flows through the seven cells 10 connected to each other in series in Example 1 and the amounts of electric charge in the respective cells 10 are same as each other. Therefore, the amounts of gold/silver ions produced from the respective cells 10 are the same as each other, and thus the concentration of gold/silver ions increases seven times compared to the case where a single cell 10 is provided.

Therefore, the concentration of gold/silver ions of the nano-gold/silver ionized water is determined by the number of cells 10. When the number of cells 10 is larger or when the voltage is higher, a larger amount of current flows, and thus the concentration of gold/silver ions is increased. Therefore, it is possible to control the concentration of gold/silver ions by controlling the number of cells 10 or the magnitude of voltage.

Meanwhile, since the polarities of the power supply alternate every predetermined period of time using the alternate variable DC power supply 700, the silver/gold electrode plates 70 located on both wall surfaces of the cells 10 are uniformly electrolyzed, thus allowing the durability of the silver/gold electrode plates 70 to be uniform.

Especially, when nano-gold/silver ionized water having a constant concentration of gold/silver ions is required, the flow meter M is provided to measure the amount of water supplied through the water inlet 30, thus maintaining a desired concentration of gold/silver ions by increasing or decreasing the voltage based on the amount of water supplied.

FIG. 8 shows a modification of Example 1 of the present invention in which the upper body 50 has a structure different from that of the lower body 60. In the modified example of FIG. 8, the upper and lower bodies 50 and 60 have the same structure.

That is, the upper and lower bodies 50 and 60 have a symmetrical structure in which the waterway 340 including the cells 10, the connecting passages 20, the water inlet 30, and the nano-gold/silver ionized water outlet 40 is formed in the same manner.

Moreover, the upper and lower bodies 50 and 60 may not have the symmetrical structure in which the waterway 340 is formed in the same manner but have various shapes cut in the ratio of 1:2, 1:3, or 2:3.

Another modification of Example 1 of the present invention is shown in FIG. 9. A pair of fixing grooves 100 is independently formed in each cell 10, and the silver/gold electrode plates 70 are formed in the pair of fixing grooves 100 and connected to each other in parallel. The fixing grooves 100 of each cell 10 are separated and not connected to the fixing grooves 100 of adjacent cells 10. Therefore, a pair of silver/gold electrode plates 70 is connected in each cell 10, and the silver/gold electrode plates 70 that form an overlapping U-shape are electrically connected to each other in parallel.

Since the silver/gold electrode plates 70 are electrically connected to each other in parallel, the voltage applied to the respective cells 10 is constant, and thus the total current flowing through the respective cells 10 is increased with an increase in the number of cells 10. As a result, the magnitude of the current flowing through the respective cells 10 is increased, thus increasing the concentration of gold/silver ions of the nano-gold/silver ionized water.

Example 2

No connecting passage is provided in Example 2 differently from Example 1, instead, insulators 80 substituting for the connecting passages 20 are provided, which will be described below.

An apparatus for automatically producing nano-gold/silver ionized water of Example 2 of the present invention includes: a waterway 340 including a plurality of cells 10 in which a pair of fixing grooves 100 is formed on both sides thereof, a plurality of insulators 80 disposed between adjacent cells 10 to insulate the cells 10 from each other, a water inlet 30 and a nano-gold/silver ionized water outlet 40 connected to the cells 10 at both ends, the water outlet 40 including a concentration sensor 400 disposed on the top thereof; a main body H in which upper and lower bodies 50 and 60 are closely adhered to each other; and a plurality of silver/gold electrode plates 70 mounted in the fixing grooves 100.

The waterway 340 comprising the plurality of cells 10 is formed in a zigzag shape.

Each of the silver/gold electrode plates 70 has a ⊏-shape, and the silver/gold electrode plates 70 are alternately arranged in the fixing grooves 100.

The pair of fixing grooves 100 is independently formed in each cell 10, and the silver/gold electrode plates 70 are disposed in the pair of fixing grooves 100 and connected to each other in parallel.

The fixing grooves 100 on one side of adjacent cells 10 are alternately connected to each other, and the silver/gold electrode plate 70 is disposed in the two connected fixing grooves 100 and connected in series.

The waterway 340 has a straight shape or a U-shape.

As shown in FIGS. 10 to 15, each of the plurality of cells 10 includes a pair of fixing grooves 100 having the plurality of silver and electrode plates 70, which alternately receive positive and negative voltages and face each other. Grooves having an opening on the top thereof and arranged in a plurality of rows each having three grooves have a zigzag shape to form the respective cells 10. The insulator 80 is disposed between adjacent cells 10, and the water inlet 30 and the nano-gold/silver ionized water outlet 40 are connected to the cells 10 at both ends, thus forming the U-shaped waterway 340 in a zigzag shape. The fixing groove 100 is provided at the end of the first raw such that a ⊏-shaped cell 10 is fixedly connected thereto. Moreover, although not shown in the figures, the upper body 50 is closely adhered to the lower body 60.

In detail, a plurality of fastening holes 500 into which bolts are inserted are formed on both sides of the upper body 50 and a plurality of screw holes 600 are formed on both sides of the lower body 60 such that the upper and lower bodies 50 and 60 are fastened by the bolts in which the waterway 340 including the water inlet 30, the plurality of cells 10, the plurality of insulators 80, and the nano-gold/silver ionized water outlet 40 is formed.

FIG. 13 shows that the exterior of the upper body 50 is molded with epoxy resin to provide a waterproofing function.

As described above, the silver/gold electrode plates 70 are alternately positioned to face each other such that the cells 10 are electrically connected to each other by the silver/gold electrode plates 70.

According to Example 2 of the present invention, when water is supplied from a reservoir located at a higher elevation or by a pump, positive or negative voltage are alternately supplied to the bent silver/gold electrode plates 70 at the inlet 30 by an alternate variable DC power supply 700. Then, a current flows between the two straight silver/gold electrode plates 70 having opposite polarities and facing each other through water as an electrolyte such that gold/silver ions are produced from the silver/gold electrode plates 70 by the current. The thus produced nano-gold/silver ions are dissolved in water and react with water to form silver hydroxide AgOH and Au(OH)$_3$. The silver hydroxide changes the water into alkaline water (pH 7.1 to 8.0), thus producing nano-gold/silver ionized water having strong detergency. The thus produced nano-gold/silver ionized water passes through the insulator 80 to migrate to the next cell 10. At this time, the direction of current alternates by the insulator 80 to produce the nano-gold/silver ionized water, and the thus produced nano-gold/silver ionized water is uniformly mixed by the flow velocity of raw water that continuously flows. Then, the current is transferred to the next cell 10 by the straight silver/gold electrode plates 70 on one side of the cell 10 and operates in the same manner as the first cell 10 to produce nano-gold/silver ionized water having a higher concentration. When the current continuously passes through the cells 10 of the waterway 340 and operates in the same manner, the nano-gold/silver ionized water having an increased concentration is discharged through the nano-gold/silver ionized water outlet 40.

A concentration sensor 400 capable of detecting the ion concentration of the ionized water discharged at this time is provided and controlled by the microprocessor to optimally control the ion concentration.

Since the nano-gold/silver ionized water is continuously produced in the respective cells 10, the concentration of gold/silver ions increases while passing through the respective cells 10. Since the amount of gold/silver ions produced is proportional to the amount of electric charge and the amount of electric charge is proportional to "current X time" a constant current flows through the plurality of cells 10 connected in series in Example 2 and the amounts of electric charge in the respective cells 10 are same as each other. Therefore, the amounts of gold/silver ions produced from the respective cells 10 are the same as each other, and thus the concentration of gold/silver ions increases seven times compared to the case where a single cell 10 is provided, which is shown in FIG. 13.

Therefore, the concentration of gold/silver ions of the nano-gold/silver ionized water is determined by the number of cells 10. When the number of cells 10 is larger or when the voltage is higher, a larger amount of current flows, and thus the concentration of gold/silver ions is increased. Therefore, it is possible to control the concentration of gold/silver ions by controlling the number of cells 10 or the magnitude of voltage.

Meanwhile, since the polarities of voltage alternate every predetermined period of time using the alternate variable DC power supply 700, the silver/gold electrode plates 70 located on both wall surfaces of the cells 10 are uniformly electrolyzed, thus allowing the durability of the silver/gold electrode plates 70 to be uniform.

Especially, when nano-gold/silver ionized water having a constant concentration of gold/silver ions is required, a flow meter M is provided to measure the amount of water supplied through the water inlet 30, thus maintaining a desired concentration of gold/silver ions by increasing or decreasing the voltage based on the amount of water supplied.

FIG. 14 shows a modification of Example 2 of the present invention in which a pair of fixing grooves 100 is independently formed in each cell 10, and the silver/gold electrode plates 70 are formed in the pair of fixing grooves 100 and connected in parallel. The fixing grooves 100 of each cell 10 are separated and not connected to the fixing grooves 100 of adjacent cells 10. Therefore, a pair of silver/gold electrode plates 70 is connected in each cell 10, and the silver/gold electrode plates 70 that form an overlapping U-shape are electrically connected to each other in parallel.

Since the silver/gold electrode plates 70 are connected to each other in parallel, the voltage applied to the respective cells 10 is constant, and thus the total current flowing through the respective cells 10 is increased with an increase in the number of cells 10. As a result, the magnitude of the current flowing through the respective cells 10 is increased, thus increasing the concentration of gold/silver ions of the nano-gold/silver ionized water.

FIG. 16 shows another example of the waterway in which the power supply is connected in series, and FIG. 17 shows still another example of the waterway in which the power supply is connected in parallel. In FIGS. 16 and 17, the waterway 340 has a zigzag shape and, since the basic configuration and operation are the same as Example 1, the detailed description thereof will be omitted.

As described above, since the apparatus for automatically producing nano-gold/silver ionized water in accordance with the present invention has a simplified structure, it can be easily fabricated with low cost. Moreover, since the ionized water is continuously produced using a waterway through which raw water flows, differently from the conventional techniques in which the raw water stays in a reservoir, it is possible to solve problems such as settlement of ionized water, and thus it is possible to produce nano-gold/silver ionized water having a desired concentration of gold/silver ions within a short period of time. As a result, the antibacterial and sterilizing activity which is an intrinsic property of the nano-gold/silver ions is improved, and the thus produced ionized water having strong detergency can be used as antibacterial and sterilizing water.

The invention claimed is:

1. An apparatus for automatically producing nano gold/silver gold or silver ionized water, the apparatus comprising:
    a plurality of cells in which a pair of fixing grooves is formed on both sides thereof;
    a plurality of connecting passages formed between adjacent cells such that the adjacent cells are connected to each other through the connecting passages;
    a main body including a waterway having a water inlet connected to the two connected cells at both ends and a nano gold or silver ionized water outlet having a concentration sensor on the top thereof, an upper body, and a lower body, the upper and lower bodies being closely adhered to each other; and
    a plurality of silver/gold electrode plates mounted in the fixing grooves.

2. The apparatus of claim 1, wherein the connecting passages are formed in the same direction as the waterway direction and, at the same time, formed inclined with respect to the waterway direction or formed in parallel to the waterway direction.

3. The apparatus of claim 1, wherein the connecting passages have a cross-section equal to or smaller than that of the cell.

4. The apparatus of claim 1, wherein the silver/gold electrode plates are alternately arranged in the fixing grooves.

5. The apparatus of claim 1, wherein the pair of fixing grooves is independently formed in each cell, and the silver/gold electrode plates are disposed in the pair of fixing grooves and connected to each other in parallel.

6. The apparatus of claim 1, wherein the fixing grooves on one side of the adjacent cells are alternately connected to each other, and the silver/gold electrode plate is provided in the two connected fixing grooves and connected to each other in series.

7. The apparatus of claim 1, wherein the waterway has a straight shape.

8. The apparatus of claim 1, wherein the waterway has a U-shape.

9. An apparatus for automatically producing nano gold or silver ionized water, the apparatus comprising:
    a plurality of cells in which a pair of fixing grooves is formed on both sides thereof;
    a plurality of insulators for insulating the plurality of cells from each other;
    a main body including a waterway having a water inlet connected to the two connected cells at both ends and a nano gold or silver ionized water outlet having a concentration sensor on the top thereof, an upper body, and a lower body, the upper and lower bodies being closely adhered to each other; and
    a plurality of silver/gold electrode plates mounted in the fixing grooves.

10. The apparatus of claim 9, wherein the waterway comprising the plurality of cells is formed in a zigzag shape.

11. The apparatus of claim 9, wherein each of the silver/gold electrode plates has a ⊏-shape.

12. The apparatus of claim 9, wherein the silver/gold electrode plates are alternately arranged in the fixing grooves.

13. The apparatus of claim 9, wherein the pair of fixing grooves is independently formed in each cell, and the silver/gold electrode plates are disposed in the pair of fixing grooves and connected to each other in parallel.

14. The apparatus of claim 9, wherein the fixing grooves on one side of the adjacent cells are alternately connected to each other, and the silver/gold electrode plate is provided in the two connected fixing grooves and connected to each other in series.

15. The apparatus of claim 9, wherein the waterway has a straight shape.

16. The apparatus of claim 9, wherein the waterway has a U-shape.

* * * * *

UNITED STATES PATENT AND TRADEMARK OFFICE
CERTIFICATE OF CORRECTION

PATENT NO. : 8,449,732 B2
APPLICATION NO. : 12/933880
DATED : May 28, 2013
INVENTOR(S) : Choi It is certified that error appears in the above-identified patent and that said Letters Patent is hereby corrected as shown below:

In the Claims

Column 13, line 12 (Claim 1) "An apparatus for automatically producing nano gold/silver gold or silver ionized water," should be changed to --An apparatus for automatically producing nano gold or silver ionized water,--

Signed and Sealed this
Ninth Day of July, 2013

Teresa Stanek Rea
*Acting Director of the United States Patent and Trademark Office*